United States Patent
Yamamoto et al.

(10) Patent No.: US 7,723,212 B2
(45) Date of Patent: May 25, 2010

(54) METHOD FOR FORMING MEDIAN CRACK IN SUBSTRATE AND APPARATUS FOR FORMING MEDIAN CRACK IN SUBSTRATE

(75) Inventors: Koji Yamamoto, Hirakata (JP); Noboru Hasaka, Osaka (JP)

(73) Assignee: Mitsuboshi Diamond Industrial Co., Ltd, Suita (JP)

( * ) Notice: Subject to any disclaimer, the term of this patent is extended or adjusted under 35 U.S.C. 154(b) by 274 days.

(21) Appl. No.: 11/572,931

(22) PCT Filed: Jul. 29, 2005

(86) PCT No.: PCT/JP2005/013980

§ 371 (c)(1),
(2), (4) Date: Jan. 28, 2008

(87) PCT Pub. No.: WO2006/011608

PCT Pub. Date: Feb. 2, 2006

(65) Prior Publication Data

US 2008/0194079 A1  Aug. 14, 2008

(30) Foreign Application Priority Data

Jul. 30, 2004 (JP) .............................. 2004-247570

(51) Int. Cl.
*H01L 21/00* (2006.01)

(52) U.S. Cl. ................ 438/463; 257/E21.596

(58) Field of Classification Search ................ 438/463; 257/E21.596

See application file for complete search history.

(56) References Cited

U.S. PATENT DOCUMENTS

| | | | | |
|---|---|---|---|---|
| 5,609,284 | A * | 3/1997 | Kondratenko | 225/1 |
| 6,327,875 | B1 * | 12/2001 | Allaire et al. | 65/103 |
| 6,501,047 | B1 * | 12/2002 | Xuan et al. | 219/121.69 |
| 2008/0061043 | A1 * | 3/2008 | Fujii | 219/121.69 |

* cited by examiner

Primary Examiner—Alexander G Ghyka
Assistant Examiner—Seahvosh J Nikmanesh
(74) Attorney, Agent, or Firm—Antonelli, Terry, Stout & Kraus, LLP.

(57) ABSTRACT

A method for forming a median crack and an apparatus for forming a median crack are provided, where the formation of a deep, straight median crack is possible, and an excellent broken surface of a brittle substrate can be gained as a result of breaking. In the method for forming a median crack in a brittle substrate, the brittle substrate is irradiated with a laser beam along a laser-scribe line to be formed with median cracks on the brittle substrate so as to be heated to a temperature that is no higher than its melting temperature, and thereby, a median crack is created along the laser-scribe line to be formed with median cracks and expanded starting from a notch that has been formed in the brittle substrate, and this method for forming a median crack in a brittle substrate is characterized in that high temperature portions that receive intense radiation from a laser beam, and low temperature portions that receive faint radiation from a laser beam are alternately formed along the laser-scribe line to be formed with median cracks.

12 Claims, 9 Drawing Sheets

METHOD FOR FORMING MEDIAN CRACK IN SUBSTRATE AND APPARATUS FOR FORMING MEDIAN CRACK IN SUBSTRATE

FIELD OF THE INVENTION

The present invention relates to a method for forming a median crack in a substrate and an apparatus for forming a median crack in a substrate, and in particular, a method for forming a median crack in a substrate and an apparatus for forming a median crack in a substrate where a substrate is irradiated with a laser beam so as to be heated to a temperature that is no higher than its melting temperature along a laser-scribe line to be formed with median cracks on the substrate, and thereby, a median crack is formed starting from a notch that has been formed in advance.

BACKGROUND OF THE INVENTION

In order to laser-scribe a brittle substrate such as a semiconductor wafer and break it, a glass substrate or a ceramic substrate, a method for forming a median crack (or vertical crack) is used where a laser beam and a brittle substrate are relatively moved along a laser-scribe line to be formed with median cracks on the substrate so that the substrate is heated while a refrigerant is supplied to the heated portion on the substrate.

In accordance with such a method for forming a median crack by means of a laser beam, a median crack (blind crack) is formed due to a difference between the compressive stress that is created around the heated portion and the tensile stress that is created around the cooled portion.

Patent Document 1 discloses a method for laser-scribing a substrate having predetermined properties and for breaking it, where cooling conditions and laser beam parameters which relate to the rate of laser-scribing and breaking of the substrate are appropriately selected when a median crack is formed by irradiating the substrate with the beam, and thereby, a blind crack having a required depth is formed in the substrate.

Patent Document 1: Japanese Patent No. 3027768

Patent Document 2 discloses a cutting apparatus and a cutting method for cutting a brittle material where a laser beam is partially blocked within a region irradiated with the laser beam that is formed on the surface of the brittle material, that is to say within a beam spot, using a light blocking plate, and thereby, a region where the laser beam is blocked is formed in such a manner that thermal stress is caused by a temperature gradient in the vicinity of the border between the region irradiated by the laser beam and the above described region where the laser beam is blocked, and thus, the brittle material is cut. This document discloses that a brittle material is irradiated with a laser beam of which the energy intensity is discontinuous so as to be cut.

Patent Document 2: Japanese Unexamined Patent Publication 2001-212683

It is preferable for a crack to be formed as deep as possible in the perpendicular direction in order for the division of a brittle material to be carried out easily, and in order for the quality of the brittle material on the broken surfaces to be excellent after the division in a breaking process, where the brittle material is divided by applying force to the left and right of the formed crack after the surface of the brittle material is inscribed by radiation from a laser.

Thermal strain within a substrate that may hinder the formation of such an excellent median crack is described in the following.

Figure 21:
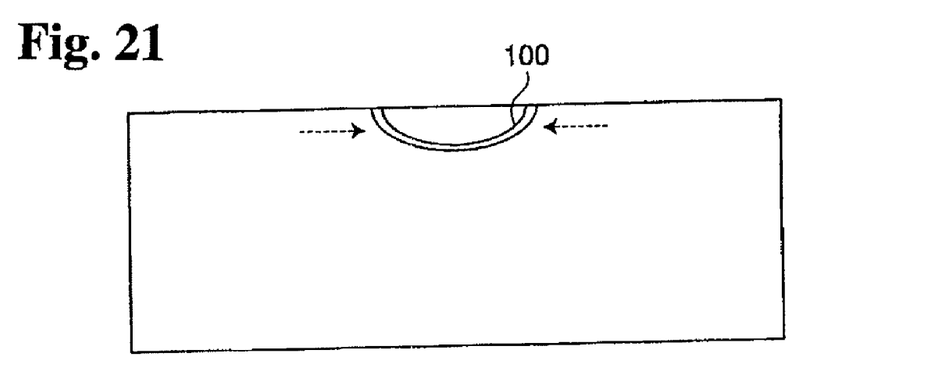
FIG. 21 is a cross sectional diagram of a brittle substrate showing thermal strain that is caused within the brittle substrate when a median crack is formed in the surface of the brittle substrate by radiation from a laser beam.
Figure 22:
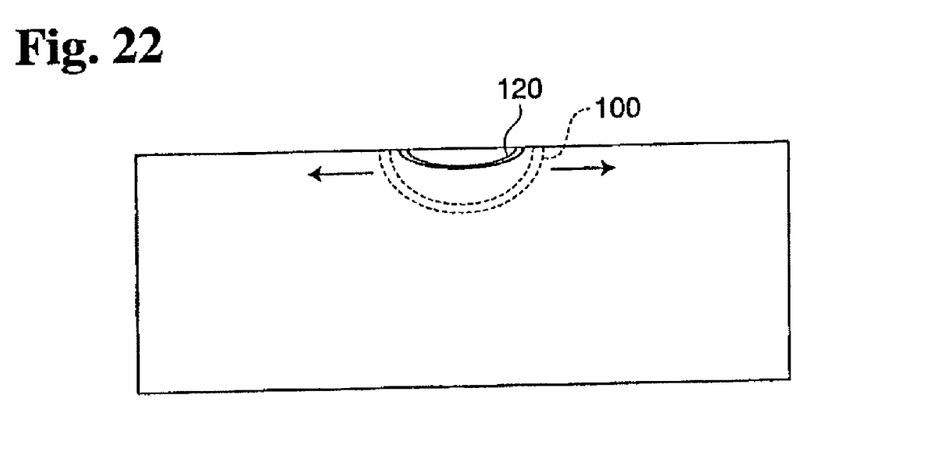
FIG. 22 is another cross sectional diagram of the brittle substrate showing thermal strain that is caused within the brittle substrate when the median crack is formed in the surface of the brittle substrate by radiation from a laser beam.
Figure 23:
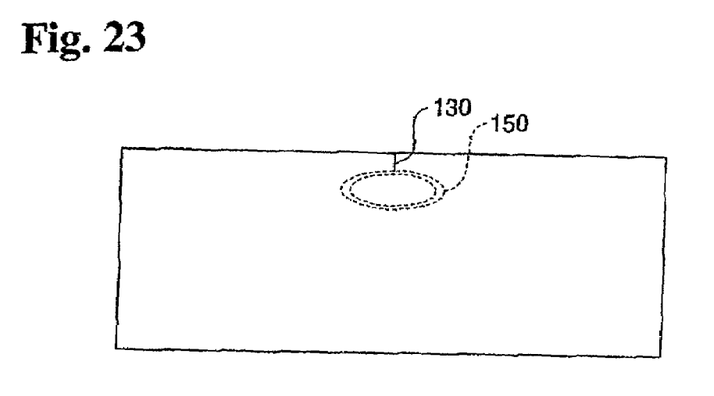
FIG. 23 is still another cross sectional diagram of the brittle substrate showing thermal strain that is caused within the brittle substrate when the median crack is formed in the surface of the brittle substrate by radiation from a laser beam.

FIGS. 21 to 23 are cross sectional diagrams of a brittle substrate for illustrating thermal strain that is created within the brittle substrate when the brittle surface of the brittle substrate is scanned and irradiated with a laser beam so that a median crack is formed in the brittle substrate. In the figures, the laser beam continuously moves outward from the paper.

As shown in FIG. 21, the compressive stress as shown by broken line arrows in the figure is created in a portion 100 that is heated by radiation from a laser beam. Subsequently, as shown in FIG. 22, when a coolant is supplied to the vicinity of portion 100 that has been heated by radiation from the laser beam so as to form a cooled spot 120, the tensile stress is created as shown by solid arrows in the figure.

As a result of this, as shown in FIG. 23, median cracks 130 extending to the thickness-wise direction of the brittle substrate is formed in the direction perpendicular to the tensile stress in accordance with the difference between the compressive stress and the tensile stress.

However, even when cooled spot 120 is formed, a sufficient difference in stress for forming a crack is limited in a surface portion of the brittle substrate. When the sufficient difference in stress for forming a crack, that is to say a difference in temperature, disappears between the heat that spreads to the thickness-wise direction of the brittle substrate from cooled spot 120 and the heat that spreads to the thickness-wise direction of the brittle substrate from heated portion 100, excessive heat that has spread to the thickness-wise direction of the brittle substrate from heated portion 100 is considered to remain in compress-stressed region 150 of a high temperature. Compress-stressed region 150 of a high temperature is defined as relative thermal strain within the brittle substrate.

As shown in FIG. 23, compress-stressed region 150 of a high temperature prevents median crack 130 from extending straight to the thickness-wise direction of the brittle substrate, and therefore, the depth of the crack to the thickness-wise direction of the brittle substrate is limited to approximately 20% to 40% of the thickness of the brittle substrate, in the case where the surface of a brittle substrate is scanned with a laser beam at a practical rate at a mass production site.

Figure 24:
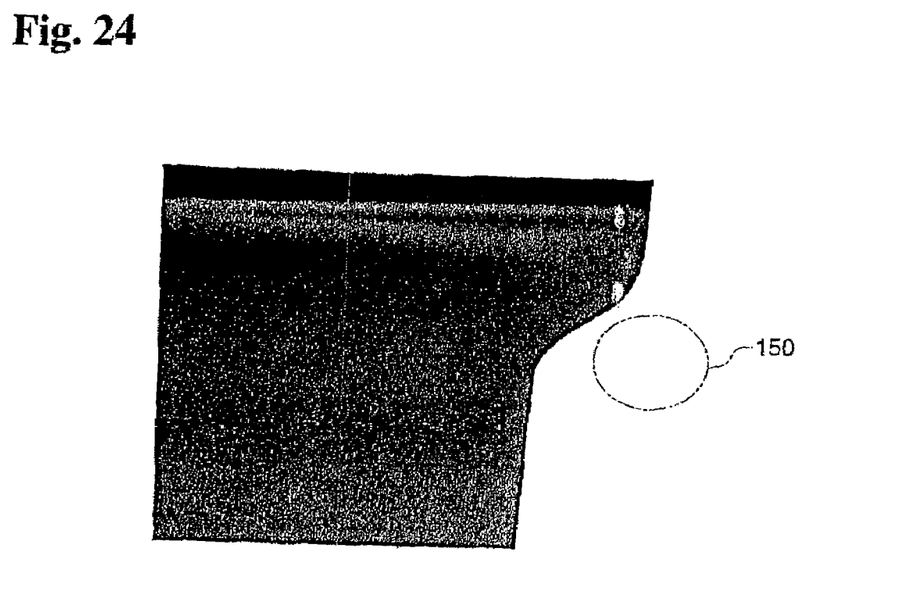
FIG. 24 is a photograph taken in the direction along one of the broken surfaces of a brittle substrate showing the broken surface that was exposed as a result of breaking after the brittle substrate was broken along the median crack that was formed according to the method of the prior art.

FIG. 24 is a photograph taken in the direction along one of the broken surfaces of a brittle substrate showing the broken surface that was exposed as a result of breaking after the brittle substrate was broken along the formed median crack.

FIG. 24 shows the state where the formed median crack has been bent in the middle. This is caused by the above described compress-stressed region 150 of a high temperature (compress-stressed region 150 of a high temperature is added and indicated by a broken line in the photograph for the purpose of illustration).

As shown in FIGS. 23 and 24, compress-stressed region 150 of a high temperature that remains prevents the formation of a deep, straight median crack, and as a result, the quality of the broken surfaces of the brittle substrate which are formed as a result of breaking is lowered. Concretely speaking, a phenomenon where the broken surfaces, including the locally broken surfaces, are formed diagonally instead of perpendicular to the surface of the brittle substrate occurs and this is referred to as "chipping."

In the above described Patent Document 1 and Patent Document 2, the vicinity of a prearranged broken line (prearranged line where a median crack is formed) is continuously irradiated with a beam spot which is not interrupted in the direction of its progress, and therefore, compress-stressed region of a high temperature remains inside a glass plate.

The present invention is provided in view of the described problem, and an object of the invention is to provide a method for forming a median crack and an apparatus for forming a median crack where the formation of a deep, straight median crack is possible, and an excellently broken surface of a brittle substrate can be gained as a result of breaking. Here, the term "substrate" in this invention means a substrate (brittle substrate) formed of a single or a number of substrates made of a brittle material.

SUMMARY OF THE INVENTION

One aspect of this invention provides a method for forming a median crack in a brittle substrate, where a brittle substrate is irradiated with a laser beam along a laser-scribe line to be formed with median cracks on the brittle substrate so as to be heated to a temperature that is no higher than its melting temperature, and thereby, a median crack is created along the laser-scribe line to be formed with median cracks and expanded starting from a notch that has been formed in the brittle substrate, wherein the method for forming a median crack in a brittle substrate is characterized in that high temperature portions that receive intense radiation from a laser beam, and low temperature portions that receive faint radiation from a laser beam are alternately formed along the laser-scribe line to be formed with median cracks.

This invention provides a method for manufacturing a single brittle substrate by separating the single brittle substrate from a mother substrate, where a brittle substrate is irradiated with a laser beam along a laser-scribe line to be formed with median cracks on the brittle substrate so as to be heated to a temperature that is no higher than its melting temperature, and thereby, a median crack is created along the laser-scribe line to be formed with median cracks and expanded starting from a notch that has been formed in the brittle substrate, wherein the method for manufacturing a single brittle substrate by separating the single brittle substrate from a mother substrate is characterized in that high temperature portions that receive intense radiation from a laser beam, and low temperature portions that receive faint radiation from a laser beam are alternately formed along the laser-scribe line to be formed with median cracks.

Here, high temperature portions correspond to portions directly beneath the surface regions which are irradiated with a laser beam and low temperature portions correspond directly beneath the surface regions which are not irradiated with a laser beam. High temperature and low temperature mean a relative temperature difference between two portions, including such cases, for example, where portions directly beneath the surface regions which are irradiated with a laser beam and the temperature does not increase so as to create a large difference vis-à-vis other portions correspond to low temperature portions.

A polygon mirror, for example, may be utilized in the radiating of a laser beam. In the case where a polygon mirror is utilized in the radiating of a laser beam, high temperature portions which receive intense radiation from a laser beam and low temperature portions which receive faint radiation from a laser beam can be alternately formed along a laser-scribe line to be formed with median cracks, for example, in the following manners:

(1) The mirror is intermittently moved so as to control the positioning of the area that is irradiated with a beam, and thereby, high temperature portions are intermittently formed.

(2) A polygon mirror is utilized for the radiating of a laser beam where the laser oscillator is switched on and off, and thereby, high temperature portions that correspond to the turned-on laser oscillator and low temperature portions that correspond to the turned-off laser oscillator are formed.

(3) A reflecting mirror from which a laser beam that has been oscillated by the laser oscillator is reflected so as to enter into a mirror surface of a polygon mirror is provided, where the reflecting angle of this reflecting mirror is changed, and thereby, a laser beam that has been oscillated by the laser oscillator is made to intermittently enter into a mirror surface of the polygon mirror so that high temperature portions that correspond to the time bands when a laser beam enters and low temperature portions that correspond to the time bands when a laser beam does not enter are formed.

(4) A reflecting mirror from which a laser beam that has been reflected from the polygon mirror is reflected so that a brittle substrate is irradiated with the laser beam along a laser-scribe line to be formed with median cracks, where the reflecting angle of this reflecting mirror is changed, and thereby, high temperature portions that are irradiated with a laser beam and low temperature portions that are not irradiated with a laser beam are formed.

Another aspect of this invention provides an apparatus for forming a median crack having: a means for heating a brittle substrate to a temperature that is no higher than its melting temperature by radiation from a laser beam; a means for relatively moving the means for heating a substrate and a brittle substrate along a laser-scribe line to be formed with median cracks on the brittle substrate; a means for supplying a refrigerant to a portion that has been heated by the means for heating a substrate; and a control unit for controlling the above described respective means, wherein the apparatus for forming a median crack is characterized in that the control unit commands the above described respective means so that high temperature portions that receive intense radiation from a laser beam and low temperature portions that receive faint radiation from a laser beam are alternately formed along the laser-scribe line to be formed with median cracks.

According to this invention, a masking member which alternately has non-light blocking portions that transmit a laser beam and light blocking portions that block a laser beam, for example, is used so as to alternately form high temperature portions which receive intense radiation from a laser beam and low temperature portions which are not irradiated with a laser beam, along a laser-scribe line to be formed with median cracks.

According to this invention, a high absorption member which alternately has highly absorbing portions that highly absorb a laser beam and transmission portions that transmit a laser beam, for example, is used so as to alternately form high temperature portions that highly absorb a laser beam and low temperature portions that absorb a laser beam at a lower rate than the above described high temperature portions, along a laser-scribe line to be formed with median cracks.

According to this invention, a reflecting member having reflecting portions from which a laser beam is reflected and slits through which a laser beam is transmitted, for example, is used so as to alternately form high temperature portions that receive the reflected laser beam and low temperature portions that do not receive the reflected laser beam, along a laser-scribe line to be formed with median cracks.

The present inventors have found that when the surface of a brittle substrate is irradiated with a laser beam along a laser-scribe line to be formed with median cracks on the brittle substrate so as to form a median crack, the surface of the brittle substrate on the laser-scribe line to be formed with median cracks is partially blocked from the laser beam so as not to form a region irradiated with the laser beam, and thereby, the following phenomenon occurs: the spread of the median crack stops at the portion of the blocked laser beam when the length of the blocked laser beam (length in the direction of the laser-scribe line to be formed with median cracks) is long, while a median crack is formed also in the portion of the blocked laser beam and the depth of the median crack that is formed in the portion of the blocked laser beam becomes great as the length of the blocked laser beam becomes short.

The present inventors focused on the above described phenomenon and defined a portion of the blocked laser beam as described above as a low temperature portion as compared to a portion of the unblocked laser beam, and then, appropriately adjusted the length of such a low temperature portion in the direction in which a median crack is formed. As a result, it has become possible to lead a median crack that has been continuously formed in a high temperature portion irradiated with a laser beam to the next high temperature portion, while preventing the occurrence of thermal strain in a low temperature portion, and preventing the median crack from being interrupted but rather forming a deep median crack in the low temperature portion.

According to this invention, high temperature portions that intensively receive radiation from a laser beam and low temperature portions that receive faint radiation from a laser beam are alternately formed along a laser-scribe line to be formed with median cracks, and therefore, the occurrence of compress-stressed region of a high temperature within a brittle substrate (such as a glass plate) along the laser-scribe line to be formed with median cracks can be prevented. Any compress-stressed region of a high temperature does not exist inside the median crack that has been formed, and even if it exists, the occurrence thereof is limited to the minimum degree, and therefore, a straight, deep, continuous median crack can be formed with high precision in the low temperature portions and the high temperature portions.

In the low temperature portions, heating more than necessary can be prevented in a manner where a necessary temperature gradient can be formed vis-à-vis the high temperature portions, and therefore, a straight, deep, continuous median crack can be formed with high precision, thus making it possible to either simplify a breaking apparatus for dividing a brittle substrate or omit it in some cases depending on the material or the thickness of the brittle substrate.

A low temperature portion has a predetermined length along the laser-scribe line to be formed with median cracks so as not to interrupt, in the low temperature portion, the median crack that has been formed continuing from a high temperature portion along the laser-scribe line to be formed with median cracks.

A straight, deep median crack can be formed so as to continue from a high temperature portion to another high temperature portion through a low temperature portion by selecting an appropriate maximum length for the low temperature portion along the laser-scribe line to be formed with median cracks.

In the case where the low temperature portions are regions directly beneath the non-irradiated portions which are not irradiated with a laser beam, the occurrence of thermal strain can be almost completely prevented in the low temperature portions. Accordingly, median cracks extending deep to the thickness-wise direction of the brittle substrate can be formed by supplying a small amount of thermal energy.

In the case where at least a portion of a substrate is irradiated with a laser beam a number of times where the low temperature portions correspond to portions that have been irradiated with a laser beam just once or a small number of times, high temperature portions and low temperature portions can be alternately formed without additionally using a masking member, or the like, thus simplifying the mechanism.

In the case where a masking member is placed on a brittle substrate so that a low temperature portion corresponds to a portion where a laser beam is blocked by the masking member, the control mechanism for the positions where beam spots are formed can be simplified.

In the case where a high absorption member, of which the ratio of absorption of a laser beam is higher than that of a brittle substrate, is provided on the brittle substrate so that a high temperature portion corresponds to a portion which is irradiated with a laser beam via the above described high absorption member, a necessary temperature gradient vis-à-vis a low temperature portion can be formed by supplying a small amount of thermal energy. Accordingly, stress that remains within the brittle substrate can be reduced, and thereby, median cracks extending deep to the thickness-wise direction of the brittle substrate can be formed.

In the case where a reflecting member for reflecting a laser beam that has passed through a brittle substrate is provided on the side opposite to the side that is irradiated with a laser beam so that a high temperature portion corresponds to a portion where a laser beam is reflected from the above described reflecting member, a working process for moving a reflecting member accompanying the conveyance of a brittle substrate becomes unnecessary.

EXPLANATION OF NUMERALS 1 apparatus for forming a median crack
2 apparatus for forming a median crack
3 apparatus for forming a median crack
4 apparatus for forming a median crack
6 masking member
7 reflecting member
8 absorbing member
9 reflecting member
11 laser tube
12 beam transmission unit
13 beam forming unit
14 refrigerant supplying unit
15 control unit
16 control unit
17 control unit
18 marker
19 control unit
22 high temperature portions
23 low temperature portions
25 high temperature portions
26 low temperature portions
30 means for radiating a laser beam of an apparatus for forming a median crack
31 polygon mirror
32 reflecting mirror
120 cooled spot
130 median crack
150 compress-stressed region of a high temperature

DESCRIPTION OF THE PREFERRED EMBODIMENTS

In the following, the embodiments of this invention are described in detail in reference to the figures.

Here, the form, the material, the purpose of application and the dimensions of a brittle substrate to which the present invention is applied are not particularly limited, and a substrate may be made of a single layer or of two or more layers made to adhere to each other; or a substrate may additionally have a thin film or a semiconductor material adhered to the surface or contained inside.

Glasses, ceramics which are sintered materials, semiconductors (for example, silicon and sapphire which are single crystal materials) and the like can be cited as the materials of a brittle substrate and, panels for flat panel displays such as liquid crystal display panels, plasma display panels and panels for organic EL displays, as well as ceramic condensers, semiconductor chips and the like, can be cited as the purpose of application for the substrate. In addition, in the case of a reflection type substrate within a substrate for a projector that is referred to as LCOS, a pair of brittle substrates where a crystal substrate and a semiconductor wafer are made to adhere to each other is used and such a brittle substrate is also included.

The embodiments of this invention are described in reference to FIGS. 1 to 20.

Here, a median crack, which is formed according to this invention, is a crack that extends in the direction of the thickness of a brittle substrate, that includes: a blind crack which is hard to see with the eye; a crack which does not completely break a brittle substrate; and a median crack which converts a brittle substrate to the state of almost being completely broken (full body cut).

FIGS. 1 to 7 are diagrams illustrating a method for forming a median crack according to this invention by categorizing types of systems.

Figure 1:
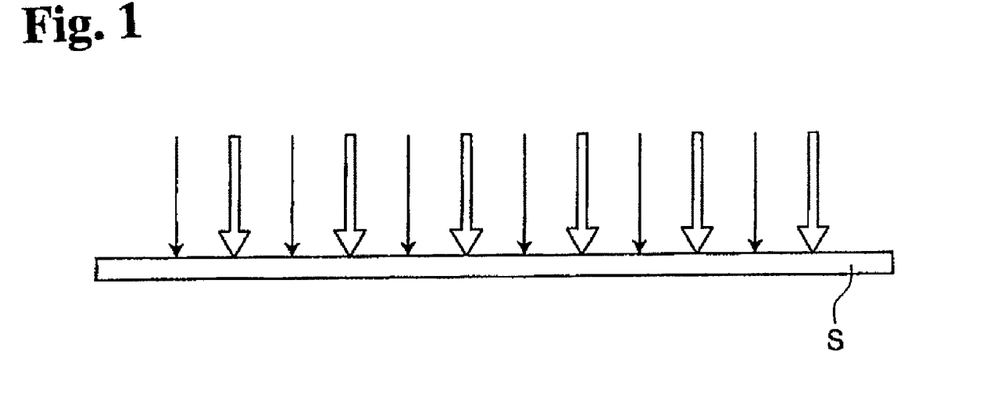
FIG. 1 is one of seven diagrams illustrating a method for forming a median crack by categorizing types of systems according to this invention.

FIG. 1 shows a system for controlling the size of thermal energy of a laser beam with which a brittle substrate S is irradiated and the number of irradiations with pulse waves. The control is carried out, for example, as follows: the degree of heating of the portions indicated by thin arrows in the figure is made small and the degree of heating of the portions indicated by thick arrows in the figure is made great; or the number of irradiations of the portions indicated by thin arrows in the figure with pulse waves is made small and the number of irradiations of the portions indicated by thick arrows in the figure with pulse waves is made great. Alternatively, a control where the above controls are combined can also be carried out.

Figure 2:
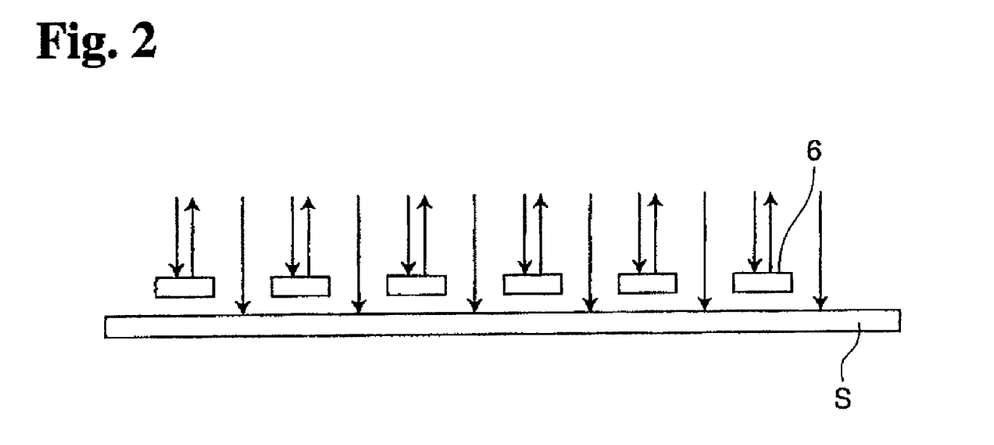
FIG. 2 is another of seven diagrams illustrating the method for forming a median crack by categorizing types of systems according to this invention.

FIG. 2 shows a system where a control is carried out in such a manner that a laser beam is mechanically blocked, which becomes possible, for example, by inserting masking members 6 in the optical system that is built in a laser head.

Figure 3:
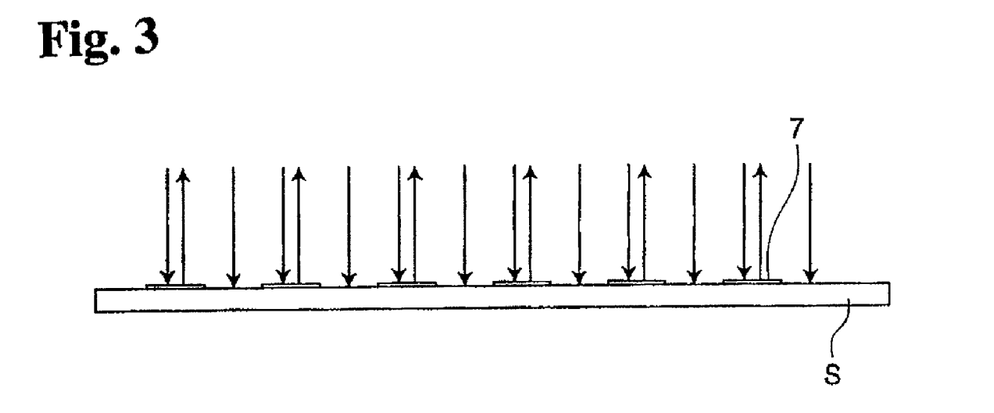
FIG. 3 is still another of seven diagrams illustrating the method for forming a median crack by categorizing types of systems according to this invention.

FIG. 3 shows a system where a control is carried out in such a manner that a laser beam is mechanically blocked in the same manner as the system of FIG. 2, which becomes possible, for example, by placing reflecting members 7 (masking members) for reflecting a laser beam on brittle substrate S. As for a method for providing reflecting members 7, a reflecting film may be applied to the surface of brittle substrate S or reflecting members 7 are placed on the surface of brittle substrate S.

Materials that cannot transmit a laser beam, for example, metals (such as aluminum) can be cited as an example of a material for forming the masking members. The form of the masking members is not particularly limited as long as the form allows alternate provisions of unblocked portions for transmitting a laser beam and blocked portions for blocking a laser beam, and for example, may be a sheet or a film where the blocked portions are connected to each other with openings for the unblocked portions, a layer or the like that is formed on brittle substrate S, or it may be in the dotted form where the blocked portions are not connected to each other. The length of the blocked portions may be, for example, in a range from 0.1 mm to 0.8 mm, preferably 0.2 mm to 0.7 mm.

Figure 4:
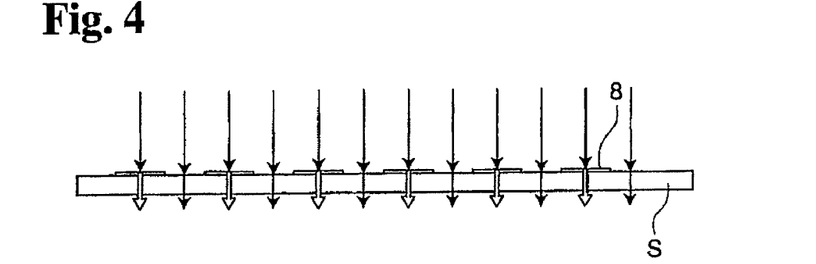
FIG. 4 is yet another of seven diagrams illustrating the method for forming a median crack by categorizing types of systems according to this invention.

FIG. 4 shows a system where a control is carried out in such a manner that the degree of absorption of a laser beam in the surface of brittle substrate S is differentiated to high and low settings, which becomes possible, for example, by placing high absorption members 8 having a high absorption ratio of a laser beam on brittle substrate S.

Materials that highly absorb a laser beam such as silica, carbon, colorants (for example black) and a composition that includes such materials can be cited as an example of a material that forms the high absorption members. The form of the high absorption members is not particularly limited as long as the form allows alternate provisions of high absorption portions for highly absorbing a laser beam and transmission portions for transmitting a laser beam, and may be, for example, a sheet or a film where the high absorption portions are connected to each other with openings for the transmission portions, a layer or the like that is formed on brittle substrate S, or it may be a dotted form where the high absorption portions are not connected to each other.

Figure 5:
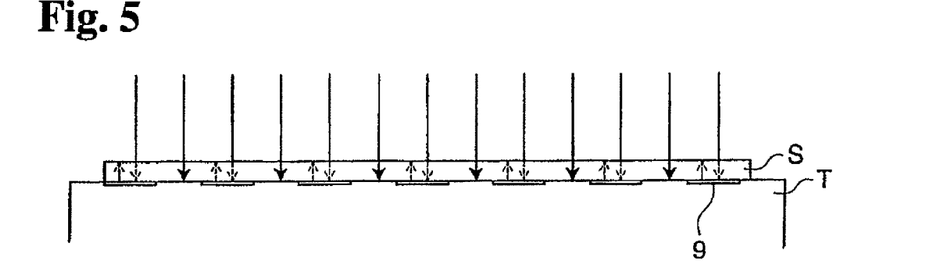
FIG. 5 is still yet another of seven diagrams illustrating the method for forming a median crack by categorizing types of systems according to this invention.

FIG. 5 shows a system where a control is carried out in such a manner that high temperature portions and low temperature portions are set on the surface of brittle substrate S and which is implemented, for example, by placing reflecting members 9 for reflecting a laser beam (members for making a laser beam re-enter into a substrate) between a table T and brittle substrate S.

Materials that reflect a laser beam, for example, metals (such as aluminum) can be cited as an example of a material that forms the reflecting members. The form of the reflecting members is not particularly limited as long as the form allows alternate provisions of reflecting portions for reflecting a laser beam and transmission portions for transmitting a laser beam, and may be, for example, a sheet or a film where the reflecting portions are connected to each other with openings for the transmission portions, a layer or the like that is formed on brittle substrate S, or it may be a dotted form where the reflecting portions are not connected to each other.

Figure 6:
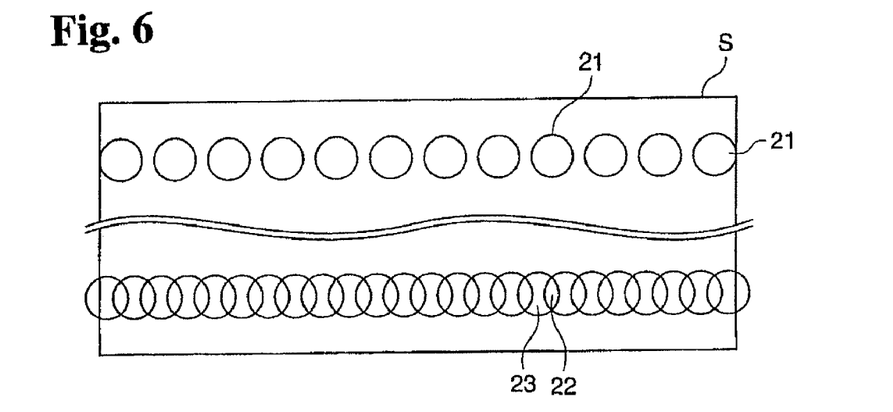
FIG. 6 is another of seven diagrams illustrating the method for forming a median crack by categorizing types of systems according to this invention.

The upper half of FIG. 6 shows a system where beam spots 21 are formed of a laser beam at predetermined intervals, and thereby, irradiated portions and non-irradiated portions are alternately formed, which becomes possible, for example, by controlling the form and intervals of the beam spots, the amount of heating and the number of irradiation with pulse waves.

In addition, the lower half of FIG. 6 shows a system where a substrate is irradiated with a laser beam in such a manner that adjacent beam spots at least partially overlap each other wherein portions where beam spots overlap each other and other portions are alternately formed, and thereby, high temperature portions 22 that receive intense radiation from a laser beam and low temperature portions 23 that receive radiation of low thermal energy from a laser beam are alternately formed.

Figure 7:
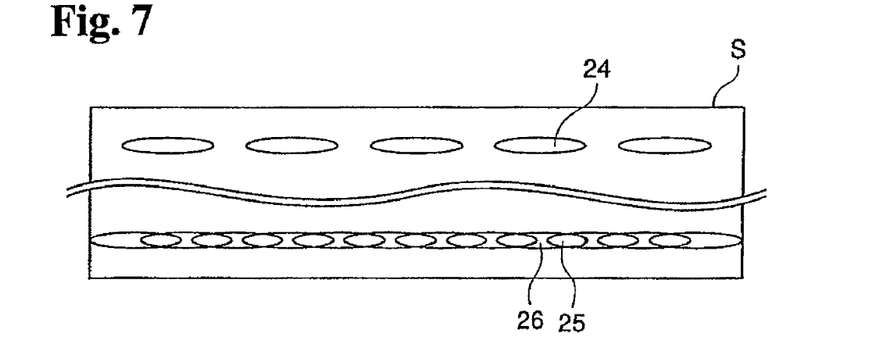
FIG. 7 is still another of seven diagrams illustrating the method for forming a median crack by categorizing types of systems according to this invention.

FIG. 7 shows a system where only the form of beam spots is different from that of FIG. 6, and portions where beam spots 24 overlap each other and other portions are alternately formed in the same manner as in the system of FIG. 6, and thereby, high temperature portions 25 that receive intense radiation from a laser beam and low temperature portions 26 that receive radiation of low thermal energy from a laser beam are alternately formed.

In the systems of FIGS. 6 and 7, the form of a beam may be changed, for example, using an optical condensing system, so that beam spots having different sizes overlap each other, or a laser beam may be made to scan by means of a galvanometer mirror or a polygon mirror so that beam spots overlap each other. The number of times of overlapping of beam spots may be 2 or greater.

Though the length of the low temperature portions depends on the material, the dimensions and the thickness of the brittle substrate, as well as the type of laser, and therefore, cannot be generalized, the length of the low temperature portions in one example is no greater than 0.8 mm and, for example, in a range from 0.1 mm to 0.8 mm, preferably in a range from 0.2 mm to 0.7 mm.

In addition, the length of the high temperature portions in one example should be in a range from 5 mm to 100 mm, for example, in a range from 10 mm to 80 mm, and preferably, in a range from 20 mm to 60 mm.

Though the embodiments of the apparatus for forming a median crack of this invention are shown in the below, this invention is not limited to these embodiments.

FIGS. 8 to 11 are diagrams illustrating concrete examples of the apparatus for forming a median crack of this invention. In addition, FIG. 12 is a diagram showing a concrete example of the means for radiating a laser beam of the apparatus for forming a median crack according to this invention.

The embodiments of the apparatus for forming a median crack are described in reference to FIGS. 8 to 12.

Here, the apparatus for forming a median crack that is described below has a configuration where a brittle substrate is irradiated with a laser beam along a laser-scribe line to be formed with median cracks so as to be heated and a refrigerant is supplied to the portion that has been heated, and thereby, a median crack is formed inside the brittle substrate.

Embodiment 1

Figure 8:
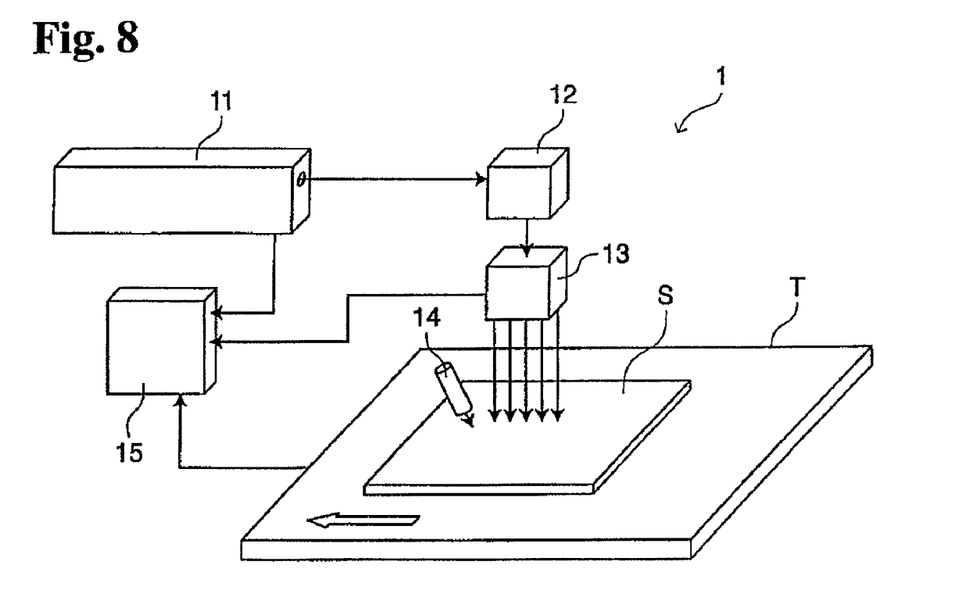
FIG. 8 is a diagram showing an apparatus for forming a median crack according to one embodiment of this invention.

FIG. 8 shows the configuration of an apparatus 1 for forming a median crack that is utilized in each system of FIGS. 1, 2, 6 and 7.

In FIG. 8, the apparatus 1 for forming a median crack is provided with a laser tube 11, a beam transmission unit 12 for transmitting a laser beam that has been radiated from laser tube 11, a beam forming unit 13 for processing a laser beam that has been transmitted from the beam transmission unit 12 to a predetermined laser beam, a refrigerant supplying unit 14 for supplying a refrigerant onto a brittle substrate S, and a control unit 15 for controlling the respective units, laser tube 11, beam forming unit 13 and refrigerant supplying unit 14.

In the system of FIG. 1, where the configuration of FIG. 8 is utilized, control unit 15 commands beam forming unit 13 that is irradiated with a number of laser beams to alternately form high temperature portions and low temperature portions.

In the system of FIG. 2 for blocking laser beams, where the configuration of FIG. 8 is utilized, beam forming unit 13 is provided with a reflecting member inside, not shown, in order to reflect a number of laser beams with which the surface of brittle substrate S is irradiated at predetermined intervals. In the reflecting member masking portions and slit portions are alternately formed, so as to create irradiated portions which are irradiated with laser beams that pass through the above described slit portions, and non-irradiated portions which are not irradiated with laser beams.

Furthermore, in the systems of FIGS. 6 and 7, high temperature portions and low temperature portions correspond to the irradiated portions which are irradiated with laser beams, and non-irradiated portions which are not irradiated with laser beams. Alternatively, at least a portion of a substrate may be irradiated a number of times with a laser beam so as to form a high temperature portion that is irradiated a great number of times with a laser beam, and a low temperature portion that is irradiated a small number of times with a laser beam.

Embodiment 2

Figure 9:
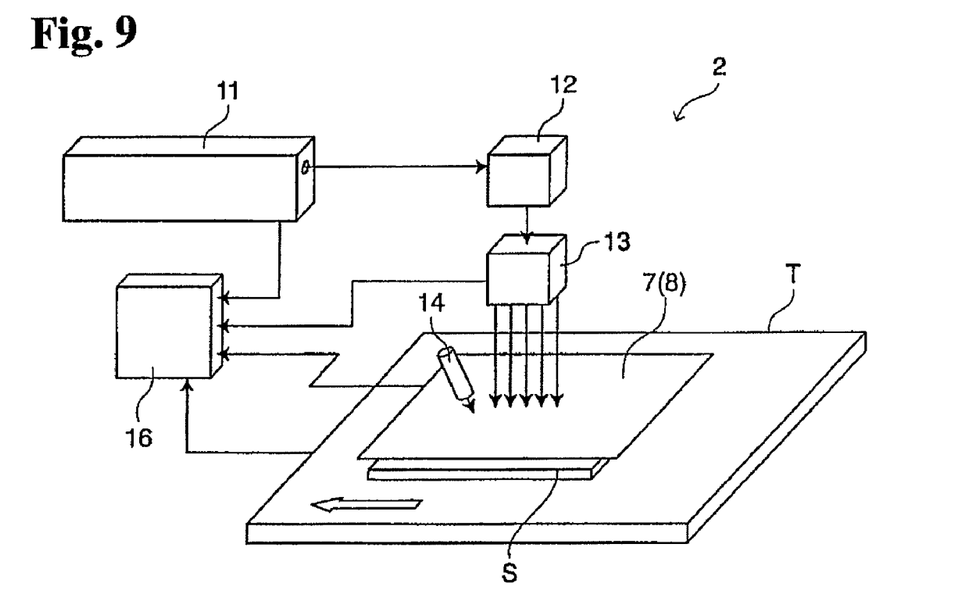
FIG. 9 is a diagram showing an apparatus for forming a median crack according to another embodiment of this invention.

FIG. 9 shows the configuration of an apparatus 2 for forming a median crack that is utilized in the systems of FIGS. 3 and 4.

In FIG. 9, the apparatus 2 for forming a median crack is provided with a laser tube 11, a beam transmission unit 12 for transmitting a laser beam that has been radiated from laser tube 11, a beam forming unit 13 for processing a laser beam that has been transmitted from beam transmission unit 12 to a predetermined laser beam, a refrigerant supplying unit 14 for supplying a refrigerant, and a control unit 16 for controlling the respective units, laser tube 11, beam forming unit 13 and refrigerant supplying unit 14.

When a median crack is formed by apparatus for forming a median crack 2 of FIG. 9 in the system where the system of FIG. 3 is implemented so as to block a laser beam with which brittle substrate S is irradiated, a reflecting member 7 having a predetermined form, dimensions and slit intervals is placed along a laser-scribe line to be formed with median cracks on brittle substrate S, as shown in FIG. 3. Reflecting member 7 is, for example, a member in sheet form where slits are formed in a predetermined pattern. When control unit 16 commands the above described respective units so that brittle substrate S is irradiated with laser beams along the laser-scribe line to be formed with median cracks, not shown, high temperature portions where brittle substrate S is irradiated with laser beams that are not reflected from the surface of brittle substrate S, and low temperature portions where laser beams are reflected from the surface of brittle substrate S by means of reflecting member 7 are alternately formed.

In the apparatus for forming a median crack 2 of FIG. 9, where the system of FIG. 4 is implemented, an absorbing member 8 having a predetermined form, dimensions and absorbent intervals is placed along a laser-scribe line to be formed with median cracks on brittle substrate S, as shown in FIG. 4. Absorbing member 8 is, for example, a member in sheet form where an absorbent is provided in a predetermined pattern. When control unit 16 commands the above described respective units so that brittle substrate S is irradiated with laser beams along the laser-scribe line to be formed with median cracks, not shown, high temperature portions, where laser beams are highly absorbed by absorbing member 8 on the surface of brittle substrate S, and low temperature portions, where laser beams are normally absorbed on the surface of brittle substrate S are alternately formed.

Embodiment 3

Figure 10:
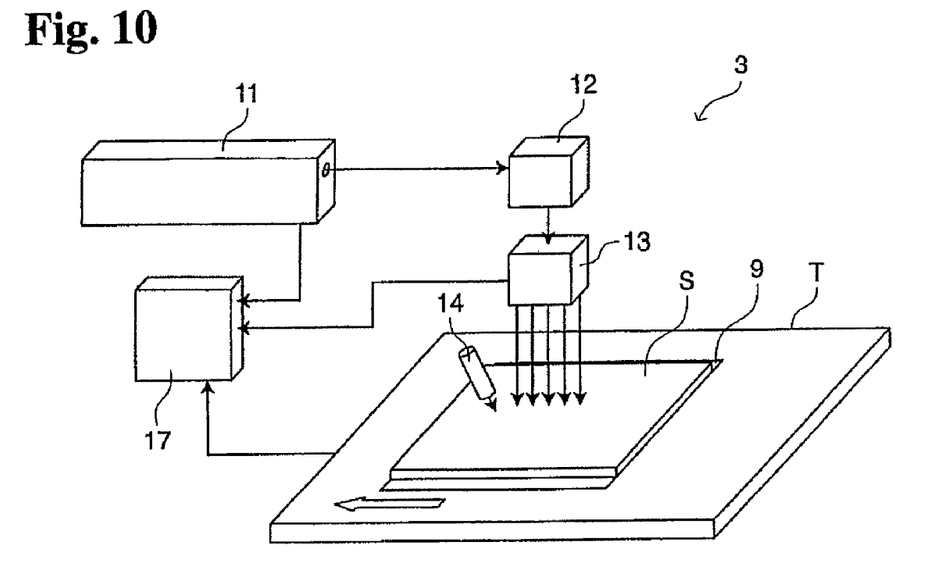
FIG. 10 is a diagram showing an apparatus for forming a median crack according to still another embodiment of this invention.

FIG. 10 shows the configuration of an apparatus 3 for forming a median crack that is utilized in the system of FIG. 5.

In FIG. 10, the apparatus 3 for forming a median crack is provided with a laser tube 11, a beam transmission unit 12 for transmitting a laser beam that has been radiated from laser tube 11, a beam forming unit 13 for processing a laser beam that has been transmitted from beam transmission unit 12 to a predetermined laser beam, a refrigerant supplying unit 14 for supplying a refrigerant, and a control unit 17 for controlling the respective units, laser tube 11, beam forming unit 13 and refrigerant supplying unit 14.

When a median crack is formed by apparatus for forming a median crack 3, first, a sheet of a reflecting member 9 is placed on the surface of a table on which a brittle substrate S is mounted. The sheet of reflecting member 9 is gained by forming reflecting member 9 having a predetermined form, dimensions and reflecting pattern intervals on a sheet, as shown in FIG. 3. Subsequently, brittle substrate S is mounted on the sheet of reflecting member 9 in such a manner that the reflecting pattern is aligned with a laser-scribe line to be formed with median cracks.

In apparatus for forming a median crack 3 of FIG. 10, where the system of FIG. 5 is implemented, when control unit 17 commands the above described respective units so that brittle substrate S is irradiated with laser beams along the laser-scribe line to be formed with median cracks, not shown, high temperature portions, where laser beams enter into the surface of brittle substrate S, are reflected from the reflecting pattern of the sheet of reflecting member 9 and reenter into brittle substrate S, as well as low temperature portions, where laser beams enter into and transmit through the surface of brittle substrate S, are alternately formed.

In Embodiment 3, it is preferable for laser tube 11 to emit a YAG laser or the like that transmits through glass to a certain depth, in the case where brittle substrate S is made of glass.

Embodiment 4

Figure 11:
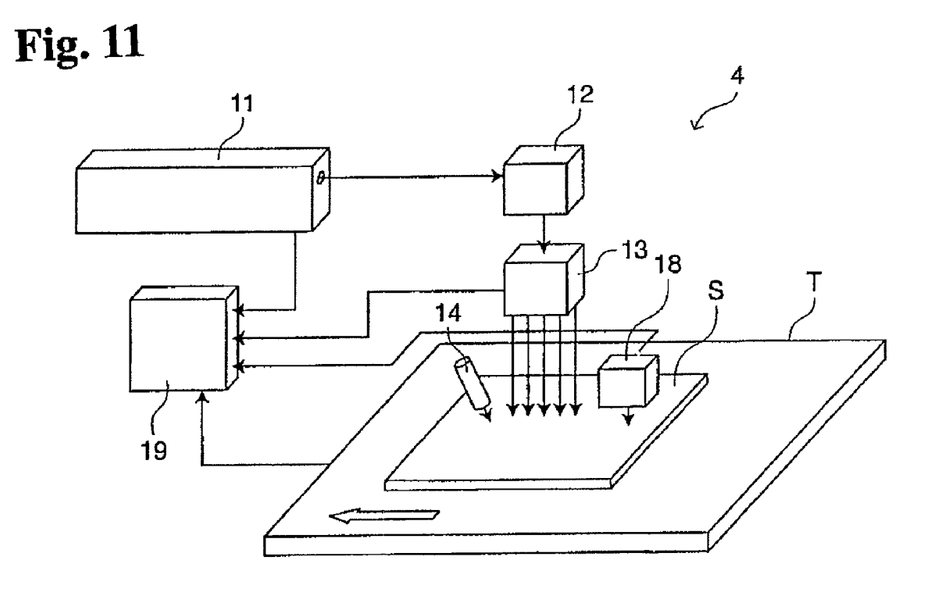
FIG. 11 is a diagram showing an apparatus for forming a median crack according to yet another embodiment of this invention.
Figure 12:
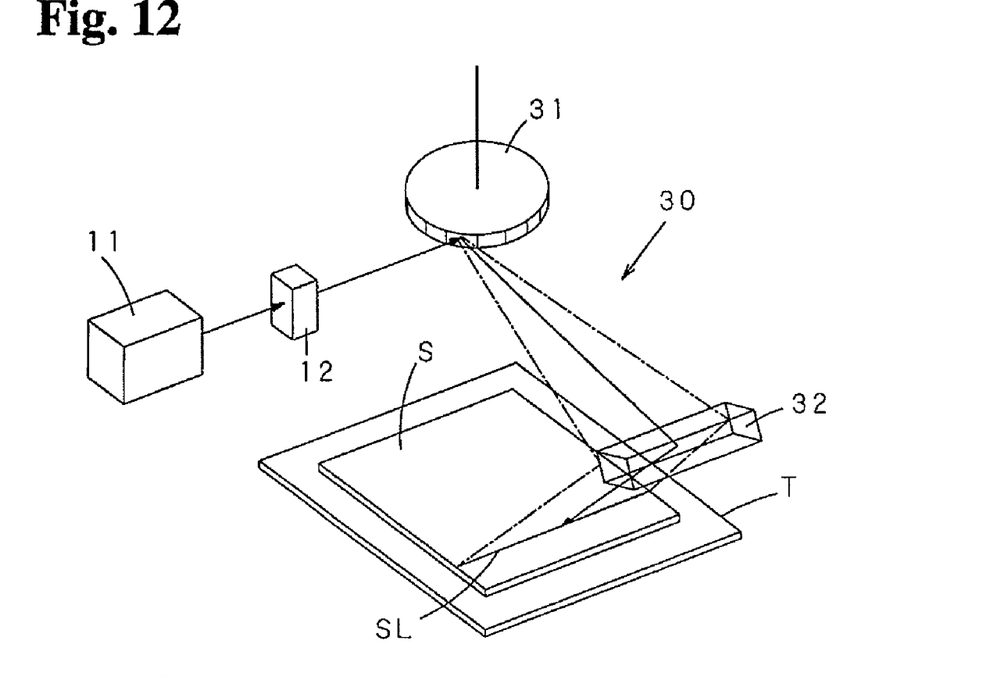
FIG. 12 is a diagram showing a means for radiating a laser beam of an apparatus for forming a median crack according to an embodiment of this invention.

FIG. 11 shows the configuration of an apparatus 4 for forming a median crack that is utilized in the systems of FIGS. 3 and 4.

In FIG. 11, the apparatus 4 for forming a median crack is provided with a laser tube 11, a beam transmission unit 12 for transmitting a laser beam that has been radiated from laser tube 11, a beam forming unit 13 for processing a laser beam that has been transmitted from beam transmission unit 12 to a predetermined laser beam, a refrigerant supplying unit 14 for supplying a refrigerant, a marker 18 for drawing a predetermined pattern on brittle substrate S with a highly sensitive absorbent that can absorb a laser beam to a high degree, and a control unit 17 for controlling the respective units, laser tube 11, beam forming unit 13, refrigerant supplying unit 14 and marker 18.

When a median crack is formed by apparatus for forming a median crack 4, first, marker 18 draws a predetermined pattern on brittle substrate S with a highly sensitive absorbent that can absorb a laser beam to a high degree while moving along a laser-scribe line to be formed with median cracks on brittle substrate S, before beam forming unit 13. Subsequently, a laser beam is radiated from beam forming unit 13 that follows marker 18. The laser beam that has been radiated is absorbed to a high degree in the portion where the pattern of the highly sensitive absorbent is drawn, thus forming a high temperature portion on brittle substrate S.

In apparatus for forming a median crack 4 of FIG. 11, where the system of FIG. 4 is implemented, a laser beam is normally absorbed in the portion where the pattern of the highly sensitive absorbent has not been drawn, thus forming a low temperature portion.

It is clear that the system of FIG. 3 can be implemented in the case where marker 18 is filled in with a reflecting agent for reflecting a laser beam in place of the above described highly sensitive absorbent, and a predetermined pattern is drawn on brittle substrate S with the reflecting agent by means of marker 18, in the configuration.

In Embodiments 1 to 4, laser beams with which brittle substrate S is irradiated may be pulse waves where the ON state and the OFF state are alternated between at a predetermined frequency, or may be continuous waves where the ON state continues.

Embodiment 5

FIG. 12 shows the configuration of a means 30 for radiating a laser beam of an apparatus for forming a median crack using a polygon mirror.

In FIG. 12, means 30 for radiating a laser beam is provided with a laser tube 11, a beam transmitting part 12 for transmitting a laser beam that is radiated from laser tube 11, a polygon mirror 31 for reflecting a laser beam that has been transmitted from beam transmitting part 12, and a reflecting mirror 32 for reflecting a laser beam that has been reflected from polygon mirror 31 so that brittle substrate S is irradiated with the laser beam along a laser-scribe line to be formed with median cracks.

When high temperature portions that are irradiated with a laser beam and low temperature portions that are not irradiated with a laser beam are formed along a laser-scribe line to be formed with median cracks (SL) on a brittle substrate using means for radiating a laser beam 30, the reflecting angle of reflecting mirror 32 is changed, and thereby, the laser beam that has been reflected from polygon mirror 31 is reflected in such a manner that irradiated portions (high temperature portions) and non-irradiated portions (low temperature portions) are alternately formed along the laser-scribe line to be formed with median cracks on the brittle substrate.

[Experiment 1]

FIGS. 13 to 17 are photographs taken in order to show median cracks which were formed by providing a mask for blocking a laser beam with which the surface of a brittle substrate was irradiated, and irradiating the brittle substrate by a laser beam partly blocked by a masking material with various lengths.

The used brittle substrates were soda glass plates having a thickness of 0.7 mm, where a thin film of aluminum was formed so as to have a predetermined length and made to adhere to the above described glass plates as the mask. A $CO_2$ laser oscillator was used as the laser tube, and the laser output was set at 60 W, while the speed of movement of the laser beam was set at 200 mm per second. The mask is indicated by M in the figures.

Figure 13:
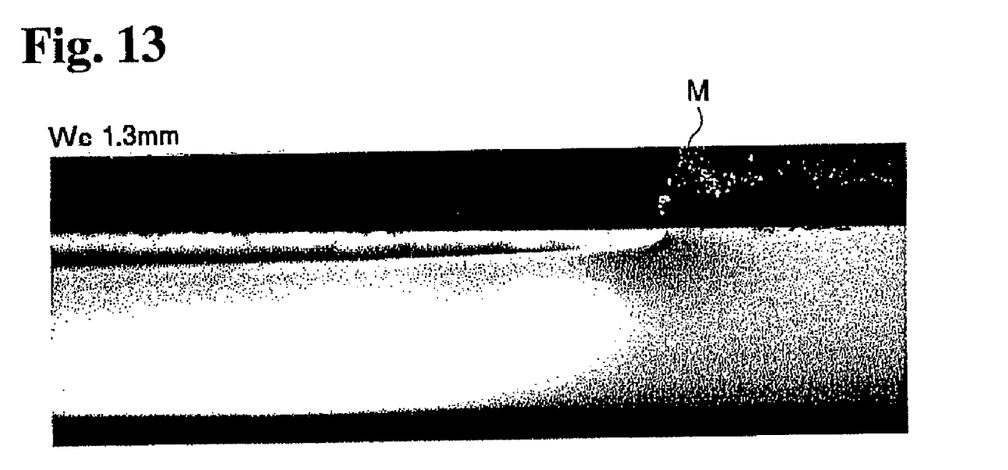
FIG. 13 is one of five photographs taken in order to show median cracks that were formed by radiation from a laser beam with different mask lengths.
Figure 14:
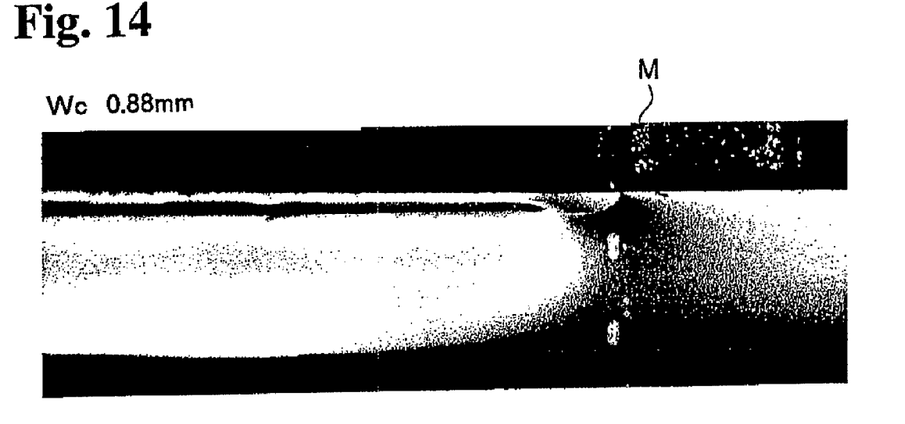
FIG. 14 is another of five photographs taken in order to show median cracks that were formed by radiation from a laser beam with different mask lengths.

As shown in FIGS. 13 and 14, in the case where the length of the mask was 1.3 mm and 0.88 mm, the formation of the median crack that spreads from the left-hand in the figure was interrupted by the mask.

Figure 15:
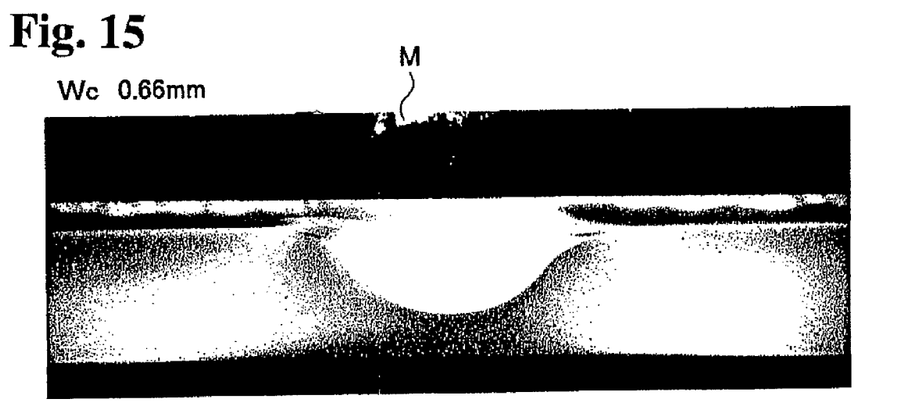
FIG. 15 is still another of five photographs taken in order to show median cracks that were formed by radiation from a laser beam with different mask lengths.

In the case where the length of the mask was 0.66 mm, as shown in FIG. 15, however, the formation of the median crack that spreads from the left-hand in the figure was not interrupted by the mask, but rather, formed in a continuous manner. In addition, the portion where the median crack that has spread was formed so as to become larger and has a bulging outline downward under the masked part.

Figure 16:
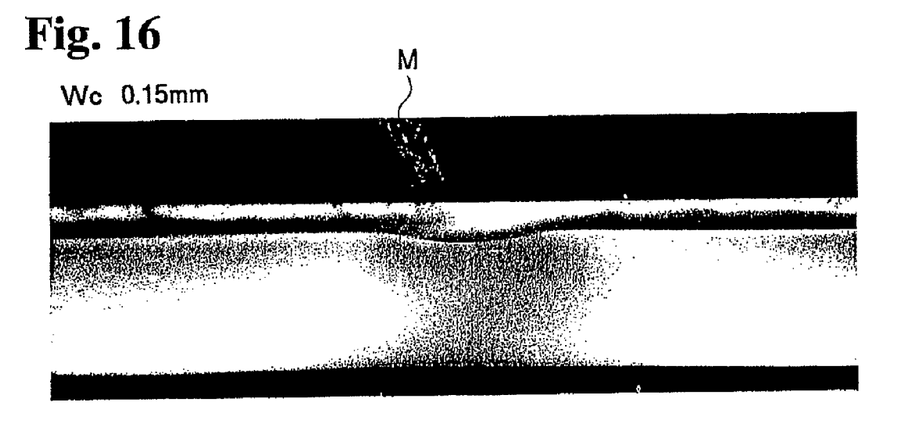
FIG. 16 is yet another of five photographs taken in order to show median cracks that were formed by radiation from a laser beam with different mask lengths.

In the case where the length of the mask was 0.15 mm, as shown in FIG. 16, though the median crack that spreads from the left-hand in the figure was not interrupted by the mask, but rather, formed in the same continuous manner as in the above, the median crack had a small downward bulging outline in the masked portion.

Figure 17:
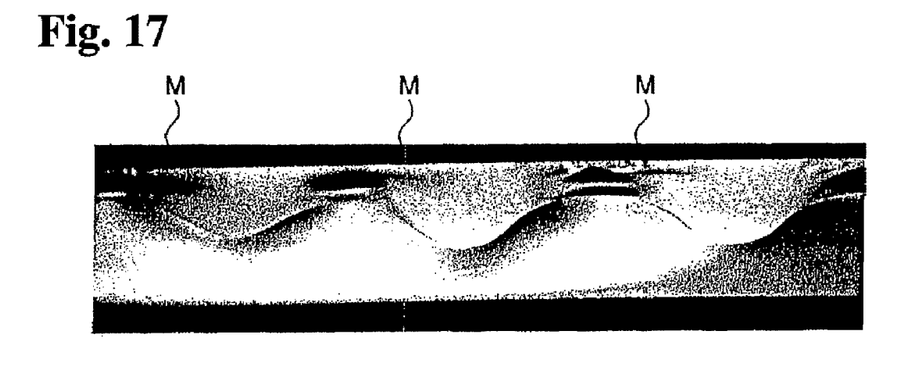
FIG. 17 is still yet another of five photographs taken in order to show median cracks that were formed by radiation from a laser beam with different mask lengths.

FIG. 17 is a photograph taken in order to show a median crack that was formed by providing masks having a length of 0.66 mm aligned at approximately equal intervals and irradiating a substrate with a laser beam.

It can be seen that the median crack that spreads from the left-hand in the figure was not interrupted by the portion where the laser beam was blocked, but rather, formed in a continuous manner, and the portion where the median crack was formed enlarges and has downward bulging outlines in the respective masked portions.

When the brittle substrate where the median crack of FIG. 17 was formed was broken along the median crack, excellent broken surfaces were gained.

[Experiment 2]

Figure 18:
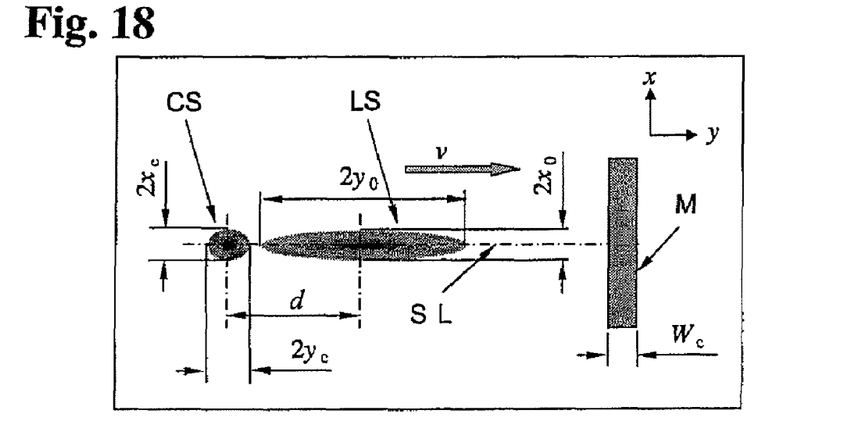
FIG. 18 is a diagram showing the positional relationships between an area heated by a laser beam (beam spot), an area cooled by a water jet (cooled spot), and a mask.

FIG. 18 is a diagram showing the positional relationships between an area that is heated by a laser beam (beam spot (LS)), an area cooled by water jet (cooled spot (CS)) and a mask.

In Experiment 2, a $CO_2$ laser oscillator was used as the laser tube. The laser output P was set to 58.7 W, the speed v of movement of the laser beam was set to 200 mm per second, the beam spot LS was elliptical [long diameter $2_{yo}$ (in the direction of the movement of the laser beam) of 22.0 mm, short diameter $2_{xo}$ of 2.1 mm], the cooled spot CS was elliptical [long diameter $2_{yc}$ (in the direction of the movement of the laser beam) of 3.0 mm, short diameter $2_{xc}$ of 2.0 mm], and distance d between the center of the beam spot LS and the center of the cooled spot CS was set to 10 mm (here, in FIG. 18, distance d is shown scaled down).

Soda glass plates having a plate thickness t of 0.55 mm and soda glass plates having a plate thickness t of 1.1 mm were used as brittle substrates. Metal plates having a plate thickness of 0.1 mm which were formed so as to have predetermined lengths (9 types in total, ranging from 0.17 mm to 0.97 mm, with increments of approximately 0.1 mm) were used as the mask.

When the brittle substrates where a median crack was formed were broken along the median crack, excellent broken surfaces were gained.

The point where the depth of the median crack becomes the maximum was approximately the center of the masked portion (blocked region). The end surfaces of the crack in the blocked region were smooth, and no trace was found where the median crack stopped spreading before reaching the maximum.

Figure 19:
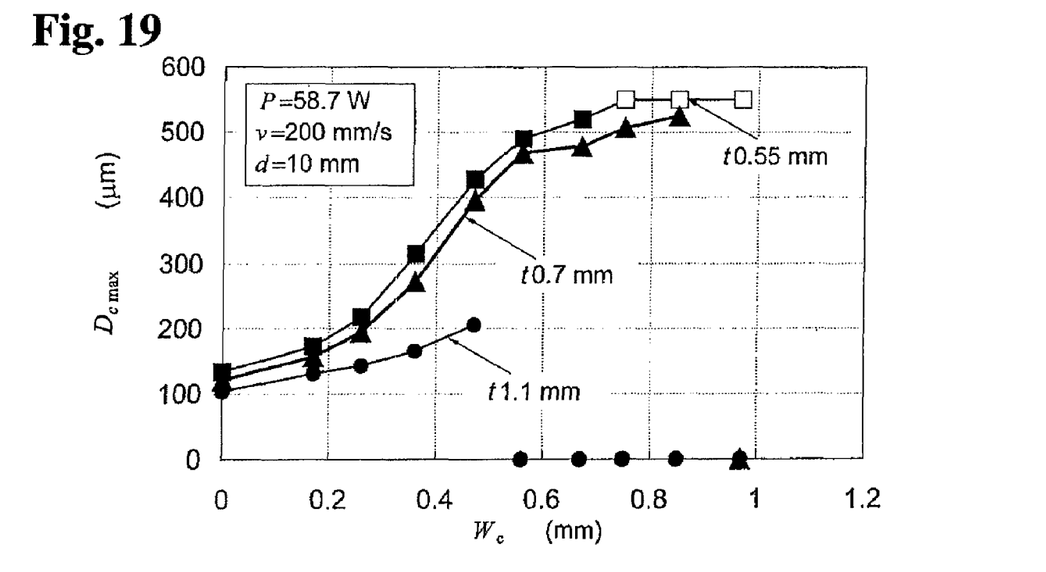
FIG. 19 is a graph showing the relationship between the maximum value $D_{cmax}$ of the depth of a median crack and the length $W_c$ of a mask.

FIG. 19 shows the relationship between the maximum value $D_{cmax}$ (µm) of the depth of the median crack and the length $W_c$ (mm) of the mask. In FIG. 19, t 0.55 mm indicates a graph showing the relationship between $D_{cmax}$ and $W_c$ in the case where the plate thickness of the brittle substrate is 0.55 mm, t 0.7 mm indicates a graph showing the relationship between $D_{cmax}$ and $W_c$ in the case where the plate thickness of the brittle substrate is 0.7 mm, and t 1.1 mm indicates a graph showing the relationship between $D_{cmax}$ and $W_c$ in the case where the plate thickness of the brittle substrate is 1.1 mm.

The respective points where $D_{cmax}$ is 0 in the graphs of t 0.7 mm and t 1.1 mm in FIG. 17 indicate a state where the median crack has stopped spreading at approximately the starting end of blocking (state like that in FIG. 13 and FIG. 14). In the graph of t 0.55 mm, hollow marks (□) indicate a state where the median crack has reached the rear surface of the brittle substrate.

Figure 20:
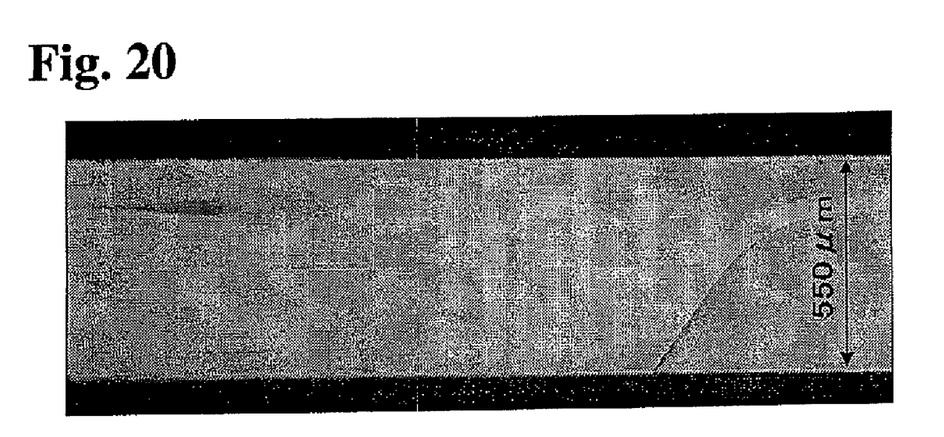
FIG. 20 is a photograph taken in order to show a median crack that has reached the rear surface of a brittle substrate.

FIG. 20 is a photograph taken in order to show a median crack that has reached the rear surface of a brittle substrate.

Here, in the case where plate thickness t of a brittle substrate was 0.7 mm in Experiment 1, the maximum value $D_{cmax}$ of the depth of the median crack increased together with length $W_c$ of the mask, until the latter became 0.87 mm, and the median crack stopped spreading when length $W_c$ of the mask became 0.88 mm. The value of length $W_c$ of the mask where the median crack stopped spreading differs, and the brittle substrates having plate thicknesses t of 0.55 mm and 1.1 mm have the same tendency as that of the brittle substrate having a plate thickness t of 0.7 mm.

It can be seen from Experiments 1 and 2 that the median crack can be made partially deep in blocked regions by partially blocking the laser scribe so as to prevent it from being irradiated by the laser. In addition, it can be seen that when the length of the portions of blocked laser beams is great, spreading of the median crack is interrupted by the portions of blocked laser beams, while the median crack is also formed in the regions directly beneath the portions of blocked laser beams and the depth of the formed median crack becomes great in the regions directly beneath the portions of blocked laser beams as the above described length of the portions of blocked laser beams becomes small.

This phenomenon is taken as follows: in the case where high temperature portions that receive intense radiation from a laser beam and low temperature portions that receive faint radiation from a laser beam (portions where laser beams are blocked by a mask) are alternately formed along a laser-scribe line to be formed with median cracks, beam spots are intermittently formed, that is, in a discontinuous manner, in the direction in which the laser beam progresses, and therefore, the high temperature portions do not form a continuous belt form in the direction in which the laser beam progresses.

Accordingly, the low temperature portions spread or absorb excessive heat from the high temperature portions, thus functioning so as to prevent the formation of compress-stressed region of a high temperature, and thereby, the occurrence of compress-stressed region of a high temperature that may cause thermal strain inside the glass plate can be prevented along the laser-scribe line to be formed with median cracks. Therefore, a desired median crack can be formed with high precision along this prearranged crack formation line. Any compress-stressed region of a high temperature that may cause thermal strain does not exist inside the median crack that has been formed, and even if it exists, the occurrence thereof is limited to the minimum degree, and therefore, a straight, deep median crack can be formed.

Configurations where a galvanometer mirror and/or a polygon mirror are installed in a portion of the optical system that is formed of laser tube 11, beam transmitting part 12 and beam forming part 13 which are utilized in Embodiments 1 to 4 are also included in the present invention.

According to this invention, high temperature portions that receive intense radiation from a laser beam and low temperature portions that receive faint radiation from a laser beam are alternately formed along a laser-scribe line to be formed with median cracks, and therefore, the occurrence of compress-stressed region of a high temperature that may cause thermal strain inside a glass plate along the laser-scribe line to be formed with median cracks can be prevented. Any compress-stressed region of a high temperature that may cause thermal strain does not exist inside the median crack that has been formed, and even if it exists, the occurrence thereof is limited to the minimum degree, and therefore, a continuous and deep median crack that extends straight into the inside of the brittle substrate can be formed with high precision in the low temperature portions and the high temperature portions.

The invention claimed is:

1. A method for forming a median crack in a brittle substrate, where a brittle substrate is irradiated with a laser beam along a laser-scribe line to be formed with median cracks on the brittle substrate so as to be heated to a temperature that is no higher than its melting temperature, and thereby, a median crack is created along the laser-scribe line to be formed with median cracks and expanded starting from a notch that has been formed in the brittle substrate, wherein
the method for forming a median crack in a brittle substrate is characterized in that high temperature portions that receive intense radiation from a laser beam, and low temperature portions that receive faint radiation from a laser beam are alternately formed along the laser-scribe line to be formed with median cracks.

2. The method for forming a median crack according to claim 1, wherein a low temperature portion has a predetermined length along the laser-scribe line to be formed with median cracks so as not to interrupt in the low temperature portion the median crack that has been formed continuing from a high temperature portion along the laser-scribe line to be formed with median cracks.

3. The method for forming a median crack according to claim 1, wherein the low temperature portions are non-irradiated portions which are not irradiated with a laser beam.

4. The method for forming a median crack according to claim 1, wherein at least a portion of a substrate is irradiated with a laser beam a number of times where a low temperature portion is a portion that have been irradiated with a laser beam a smaller number of times.

5. The method for forming a median crack according to claim 1, wherein a masking member is placed on the brittle substrate so that a low temperature portion corresponds to a portion where a laser beam is blocked by the masking member.

6. The method for forming a median crack according to claim 1, wherein a high absorption member, of which the ratio of absorption of a laser beam is higher than that of the brittle substrate, is provided on the brittle substrate so that a high temperature portion corresponds to a portion which is irradiated with a laser beam via said high absorption member.

7. The method for forming a median crack according to claim 1, wherein a reflecting member for reflecting a laser beam that has passed through the brittle substrate is provided on the side opposite to the side that is irradiated with a laser beam so that a high temperature portion corresponds to a portion where a laser beam is reflected from said reflecting member.

8. The method for forming a median crack according to claim 1, wherein a polygon mirror is utilized in radiating a laser beam.

9. The method for forming a median crack according to claim 8, wherein a reflecting mirror for reflecting a laser beam that has been reflected from the polygon mirror so that a brittle substrate is irradiated with the laser beam along a laser-scribe line to be formed with median cracks is provided, where the reflecting angle of the reflecting mirror is changed, and thereby, high temperature portions that are irradiated with a laser beam and low temperature portions that are not irradiated with a laser beam are formed.

10. The method for forming a median crack according to claim 1, wherein a polygon mirror is utilized in radiating a laser beam, and a laser oscillator is switched on and off, so that high temperature portions that correspond to the turning on of the laser oscillator and low temperature portions that correspond to the turning off of the laser oscillator are formed.

11. The method for forming a median crack according to claim 10, wherein a reflecting mirror from which a laser beam that has been oscillated by the laser oscillator is reflected so as to enter into a mirror surface of the polygon mirror is provided, where the reflecting angle of the reflecting mirror is changed, and thereby, the laser beam that has been oscillated by the laser oscillator is made to intermittently enter into a mirror surface of the polygon mirror, so that high temperature portions that correspond to the periods when a laser beam enters and low temperature portions that correspond to the periods when a laser beam does not enter are formed.

12. A method for manufacturing a divided brittle substrate, comprising the steps of: irradiating a brittle substrate with a laser beam along a prearranged median crack forming line on the brittle substrate so that the brittle substrate is heated to a temperature that is no higher than its melting temperature; creating a median crack along the laser-scribe line to be formed with median cracks; and expanding the median crack starting from a notch that has been formed in the brittle substrate, wherein the method for manufacturing a divided brittle substrate is characterized in that high temperature portions that receive intense radiation from a laser beam and low temperature portions that receive faint radiation from a laser beam are alternately formed along the laser-scribe line to be formed with median cracks, and thereby, the median crack is created and expanded.

* * * * *